(No Model.)
J. R. LITTLE.
METHOD OF CONSTRUCTING METAL WHEELS.
No. 475,584. Patented May 24, 1892.
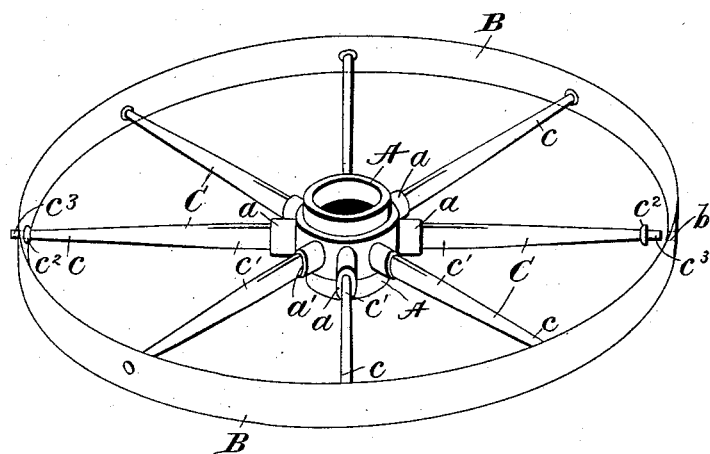
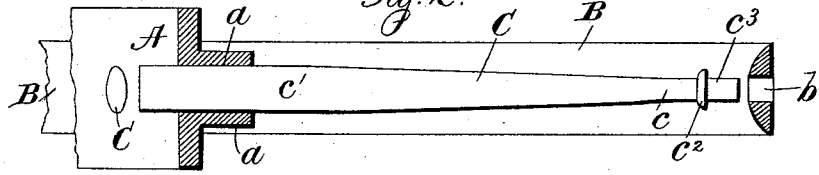
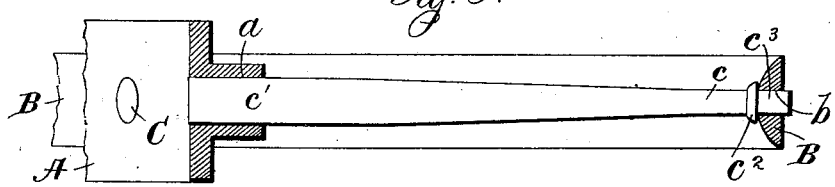
Witnesses:
Jas. C. Hutchinson.
Henry C. Hazard
Inventor.
Jas. R. Little, by
Prindle and Russell his Att'ys

UNITED STATES PATENT OFFICE.

JAMES R. LITTLE, OF QUINCY, ILLINOIS.

METHOD OF CONSTRUCTING METAL WHEELS.

SPECIFICATION forming part of Letters Patent No. 475,584, dated May 24, 1892.

Application filed November 14, 1891. Serial No. 411,893. (No model.)

*To all whom it may concern:*

Be it known that I, JAMES R. LITTLE, of Quincy, in the county of Adams, and in the State of Illinois, have invented certain new and useful Improvements in Metal Wheels; and I do hereby declare that the following is a full, clear, and exact description thereof, reference being had to the accompanying drawings, in which—

Figure 1 is a perspective view of my wheel, showing one of the spokes inserted within the hub, but not the rim, a second in position within both hub and rim, but not fastened, and the remaining spokes fastened to both of said parts; and Figs. 2 and 3 are sections of said wheel, and show, respectively, a spoke while being placed in position and a spoke after it is in place and ready to have its tenons secured.

Letters of like name and kind refer to like parts in each of the figures.

My invention is an improvement in the method of constructing metal wheels; and it consists in the method employed, substantially as and for the purpose hereinafter specified.

In the carrying of my invention into practice I construct the hub A of my wheel from steel or other suitable material in the form shown, there being around its center a series of equidistant radial bosses $a$ and $a$, that are each provided with an axial opening $a'$, which constitutes a spoke-mortise, and preferably has in cross-section an elliptical form. The rim B is constructed from iron or steel, is welded and made true, and is provided with spoke-mortises $b$ and $b$, that correspond in number to the number of the mortises $a'$ and $a'$ within said hub.

The spokes C and C of my wheel are round at their outer ends $c$ and $c$, and from thence to their inner ends $c'$ and $c'$ gradually change in transverse shape until at the latter point they conform to and are adapted to loosely fill the mortises $a'$ and $a'$. Near said outer ends or tenons each spoke is provided with an enlargement $c^3$, which when said spoke is in position within a rim-mortise $b$ is adapted to abut against the inner face of said rim and to constitute a shoulder for receiving the end-thrust. Said shoulder is formed upon said spoke in advance of the placing of the latter in the wheel.

In assembling the parts of my wheel the hub A and rim B are supported in suitable relative positions and the spokes C and C then placed separately in position by first inserting the inner end of each into a hub-mortise $a'$ and passing the same longitudinally through said opening until its outer end is within the line of the inner face of said rim and then moving said spoke longitudinally outward until its tenon $c$ is inserted within the contiguous mortise $b$ and the shoulder $c'$ rests against the inner face of said rim, after which the tenon end $c$ of said spoke is caused to fill its mortise by riveting or in any desired manner, and the tenon end $c^2$ is then by any desired means confined in place within the mortise $a'$. The spokes being of the same length, the exact coincidence of the rim and hub of the completed wheel may be readily insured by causing said parts to be firmly and accurately held in relative positions while the spokes are being secured in place; but, if desired, either said rim or hub may by suitable truing mechanism be moved any amount which may be necessary after the spokes are fastened.

Having thus described my invention, what I claim is—

As an improvement in the construction of metal wheels, the method employed, which consists in forming upon each of the spokes an enlargement, constituting the shoulder for the inner end of the rim-tenon, then inserting the inner end of each spoke into and moving the same longitudinally within a hub-mortise, then moving the spoke longitudinally outward until its outer end or tenon is contained within a rim-mortise, and, lastly, securing the ends or tenons of each spoke within their mortises, substantially as and for the purpose specified.

In testimony that I claim the foregoing I have hereunto set my hand this 10th day of September, 1891.

JAMES R. LITTLE.

Witnesses:
S. DEIDESHEIMER,
T. B. POPE.